Figure 1:
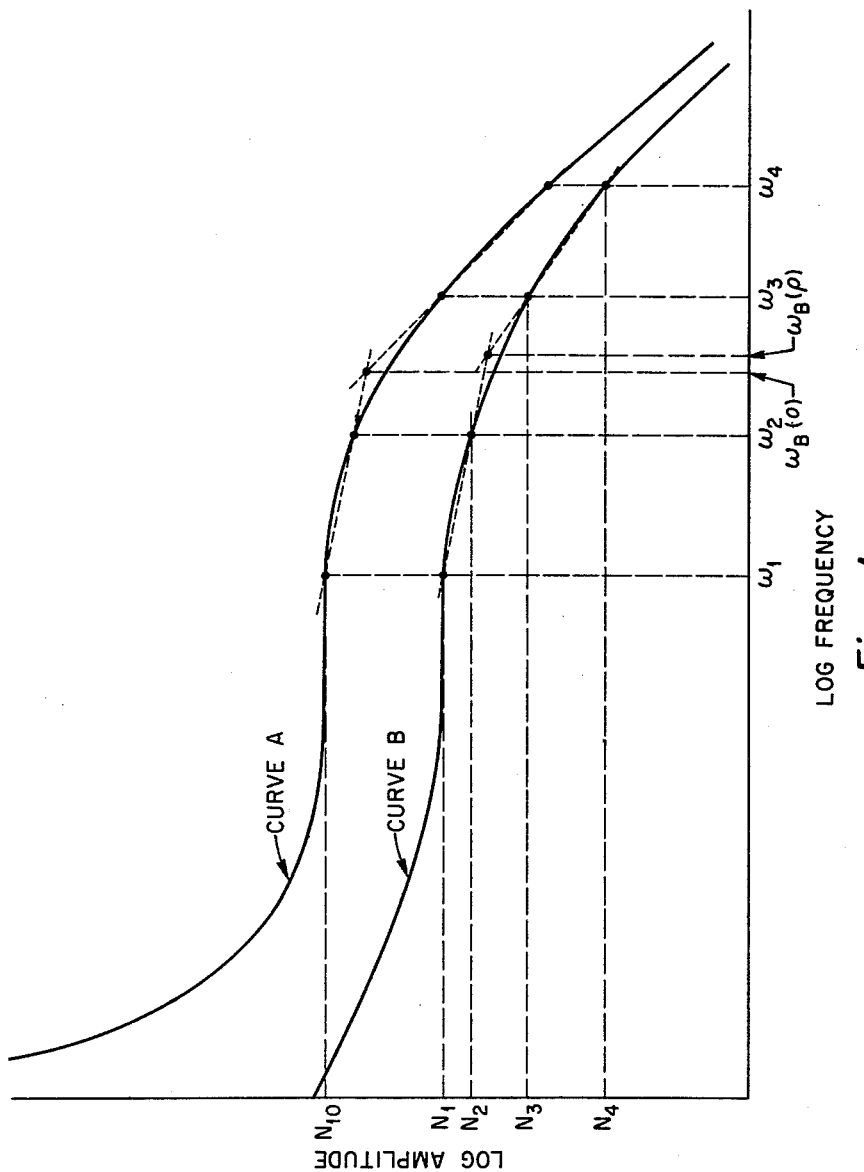

June 8, 1965   C. W. RICKER ETAL   3,188,470
METHOD OF DETERMINING THE NEGATIVE REACTIVITY
OF NEUTRONIC MULTIPLYING SYSTEMS
Filed March 5, 1963                                    2 Sheets-Sheet 1

INVENTORS.
Charles W. Ricker
Alain L. Colomb
Estle R. Mann

BY

ATTORNEY.

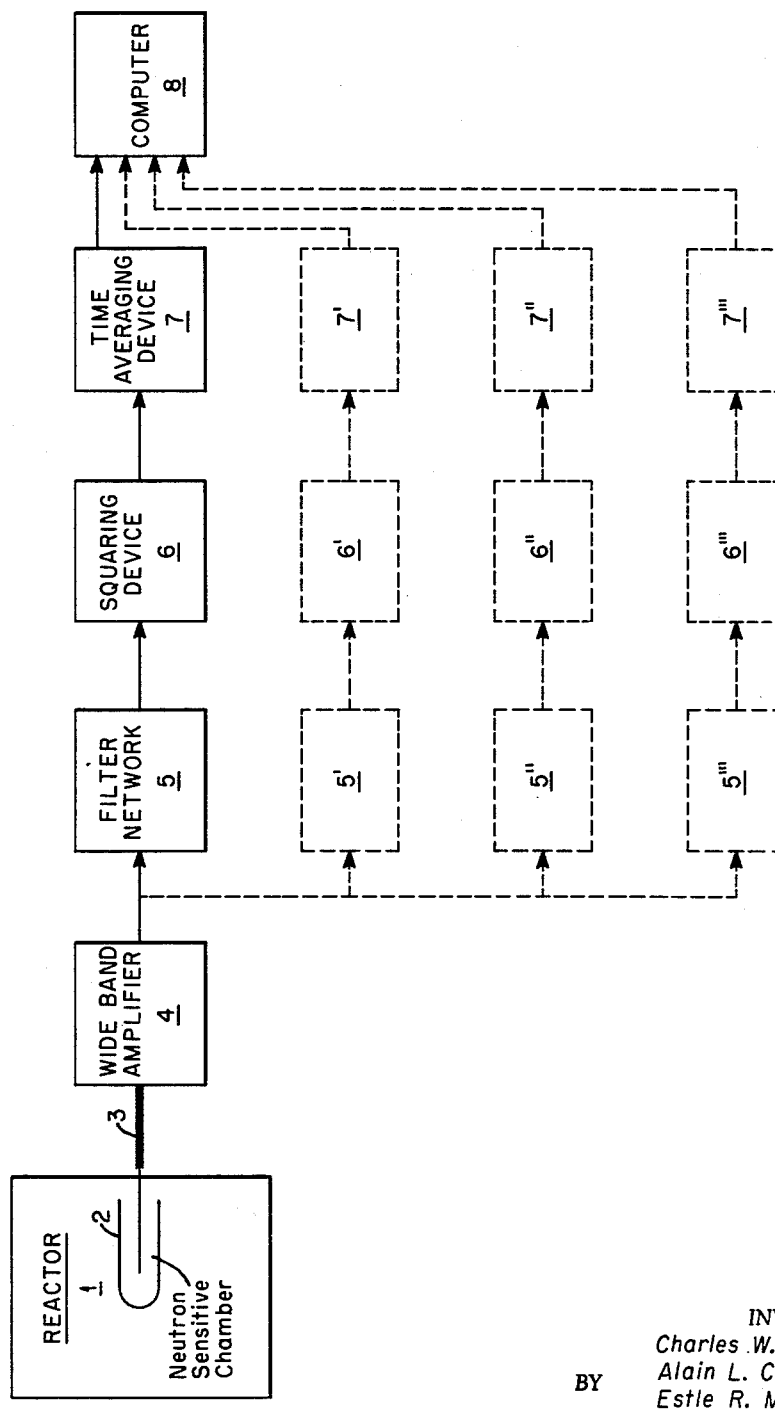

United States Patent Office 3,188,470
Patented June 8, 1965

3,188,470
METHOD OF DETERMINING THE NEGATIVE REACTIVITY OF NEUTRONIC MULTIPLYING SYSTEMS
Charles W. Ricker, Alain L. Colomb, and Estle R. Mann, Oak Ridge, Tenn., assignors to the United States of America as represented by the United States Atomic Energy Commission
Filed Mar. 5, 1963, Ser. No. 263,087
5 Claims. (Cl. 250—83.1)

This invention relates generally to a method of determining the negative reactivity of neutronic multiplying systems and more specifically to a method of measuring the negative reactivity of neutronic multiplying systems by neutron population fluctuation spectral density analysis.

The determination of shutdown margin in a neutronic multiplying system or reactor, which is the value of negative reactivity of the reactor in a completely shutdown condition (i.e., all control rods inserted as far as possible), is of significant importance in the safe operation thereof. Knowledge of the shutdown margin enables the reactor operator to make positive reactivity insertions into the reactor core with increased confidence and safety. Refueling, for example, can take place with less danger of inadvertently causing the reactor to become critical and possibly undergoing a power excursion. Negative reactivity as used herein refers to the subcritical departure of a neutronic reactor from criticality. The reactivity of a subcritical reactor is always negative which leads to the use of the term "negative reactivity." Shutdown margin relates to that lowermost value of negative reactivity which is experienced by a neutronic reactor when all means of decreasing the reactivity of the system have been employed.

A complicating factor in determining reactor shutdown margin is the transient nature of the excess reactivity built into the reactor core due to fuel depletion, fission product production and decay, and temperature effects. The worth of the various control rods also changes due to burnup of the poison therein. All these factors have made shutdown margin determination very difficult prior to the present invention.

In most reactors having neutron fluxes of $10^{13}$ neutrons/cm.$^2$/sec. or higher, the concentration of highly neutron absorbent xenon 135 builds up following reactor shutdown and reaches a peak in about 10 hours after which it decreases. This buildup is dependent on the reactor operating history, especially with regard to length of operation and neutron flux level. In many reactors having limited excess reactivity, the rapid xenon buildup presents a problem in that the reactor can be restarted within a certain limited time only. If the restarting is delayed more than the limited time, it may be necessary to wait a day or more before the xenon has decayed sufficiently to enable the reactor to be started up again. Such a delay is expensive in that it disables an expensive reactor and it may ruin experiments which require uninterrupted neutron irradiation.

All prior art methods of measuring shutdown margin have been based on the measurement of reactor response to intentionally applied system disturbances. The type of disturbance varies from neutron bombardment to oscillating neutron absorbers. These disturbances are undesirable in that they affect the reactor operation and may disrupt reactor instrumentation. The prior art methods are also undesirable in that they are discontinuous, time consuming, and require operator participation. The uncertainty which arises from the use of shutdown margin measuring methods which provide delayed and discontinuous readings, seriously limits the flexibility and safety of reactor operation. Methods requiring operator participation are additionally disadvantageous in that they impose additional manpower requirements on reactor operation, thereby hampering the reactor operator in the performance of operations such as refueling or reactor startup.

It is, therefore, a general object of the invention to provide a method for rapidly determining the negative reactivity of neutron multiplying systems.

Another object of the invention is to provide a method for continuously determining the negative reactivity of neutronic multiplying systems.

Another object of the invention is to provide a rapid and accurate method for determining the negative reactivity of neutronic multiplying systems which does not disturb or interfere with system conditions.

Still another object of the invention is to provide a method for determining the negative reactivity of a neutronic multipling system which does not require operator participation.

Other objects of the invention will become apparent from an examination of the following description of the invention and the appended drawings wherein:

FIG. 1 is an illustration showing the neutron level fluctuation spectral density of a typical reactor for conditions of both subcritical and delayed critical; and FIG. 2 is a schematic diagram of the circuitry utilized in the subject development.

In accordance with the present invention, a method of measuring the negative reactivity (shutdown margin) of a reactor in a subcritical condition is provided. Several neutron fluctuation spectral densities are measured simultaneously at fixed frequency intervals and the amplitudes thereof are used as input to a meter or computer which reads out directly the value of the negative reactivity.

To accomplish this, a neutron sensitive ionization chamber is positioned in or near the reactor core. The output thereof will contain a direct current component onto which are superimposed signals of many frequencies. Using appropriate filters, the amplitude of discrete frequency signals can be measured simultaneously and related to the reactor shutdown margin.

The spectral density of a system output signal is the mean square amplitude of that part of the noise contained in a given frequency band, divided by the bandwidth in cycles per second. It can be shown that the spectral density of an input driving function of a system is related to the spectral density of its corresponding output response function as follows:

$$\phi_{oo}(\omega) = |H(\omega)|^2 \phi_{ii}(\omega)$$

where $\phi_{oo}(\omega)$ and $\phi_{ii}(\omega)$ are the spectral densities at frequency interval $\omega$ of the output and input, respectively, and $H(\omega)$ is the system function or frequency response of the system.

In a reactor system the input driving function consists of the combined effect of source fluctuations and inherent reactivity fluctuations of the system. Since both the release of neutrons from the neutron source and the system reactivity fluctuations are very small and random in nature, the spectral density of the input driving function can be assumed constant with respect to frequency for a subcritical system. The output spectral density of the subcritical system is then a constant times the square modulus of the frequency response of the system. The spectral density of the system output is the measurable quantity and is related to the shutdown margin of neutronic multiplying systems.

Experimentally $\phi_{oo}(\omega)$ can be determined by filtering, squaring and time averaging the output signal of a neutron sensitive ionization chamber and dividing by the bandwidth of the filtering network. From the definition of spectral density, an infinite sample and time average are required. Therefore, experimentally, only an approximate determination of $\phi_{oo}(\omega)$ is possible.

The various symbols used herein have the same meaning throughout the specification and can be related directly to FIG. 1 where applicable.

To facilitate an understanding of this invention, reference is made to FIG. 1 of the attached drawings. Curves A and B show the frequency dependence of the neutron population fluctuation spectral density in a typical reactor for critical and subcritical conditions, respectively. Curves A and B are normalized with respect to reactor powder. Fluctuations in the signal from a neutron detecting ionization chamber were analyzed over a range of frequencies to obtain the frequency spectrum of the fluctuations. The signal amplitude or spectral density is shown as the ordinate of FIG. 1 with signal frequency as the abscissa. The break frequencies $\omega_B(o)$ and $\omega_B(\rho)$ of curves A and B, respectively, are determined by the intersection of straight line extrapolations from the high and middle frequency portions of the curves. The high frequency portion of each curve is that relatively straight sloping curve portion above the break frequency, and the middle frequency portion is that relatively straight and horizontal portion below the break frequency. The middle and high frequency curve portions are approximated by straight lines determined by data points measured at $\omega_1$ and $\omega_2$ for the middle frequency portions and at $\omega_3$ and $\omega_4$ for the high frequency portions. Curve B is one of an infinitely large family of curves, a separate curve existing for each value of negative reactivity. The middle and high frequency curve portions of the entire family of curves remain in the same general frequency range, thereby permitting the same discrete frequency intervals $\omega_1$, $\omega_2$, $\omega_3$ and $\omega_4$ to be used for signal amplitude measurements over a wide range of reactor negative reactivity.

The determination of reactor shutdown margin or negative reactivity through the use of neutron population fluctuation spectral densities measured at several discrete frequency intervals may be accomplished in the following ways:

(1) Four frequency channels $\omega_1$, $\omega_2$, $\omega_3$ and $\omega_4$ are used to compute the break frequency at the subcritical condition. Two of the frequency channels $\omega_1$ and $\omega_2$ are selected below the break frequency in the middle frequency range and two of the channels $\omega_3$ and $\omega_4$ are selected above the break frequency in the high frequency range. The four frequencies determine two straight lines whose intersection determines the break frequency as shown in FIG. 1. Care must be taken to avoid choosing $\omega_4$ at such a high frequency that detector noise becomes noticeable. The break frequency for the subcritical condition $\omega_B(\rho)$ can be solved from the following equation which is the solution for the intersection of two straight lines plotted on logarithmic scales:

$$\omega_B(\rho) = \log^{-1}\left\{\frac{\log\left[\left(\frac{N_3}{N_1}\right)^A \left(\frac{N_1}{N_2}\right)^B \left(\frac{N_3}{N_4}\right)^C\right]}{\log\left[\left(\frac{N_1}{N_2}\right)^D \left(\frac{N_3}{N_4}\right)^E\right]}\right\} \quad (1)$$

This value of break frequency determined from spectral density measurements can then be inserted into the following equation for negative reactivity:

$$\rho = \left[\frac{\omega_B(0) - \omega_B(\rho)}{\omega_B(\rho) - \beta_e \omega_B(0)}\right] \quad (2)$$

where $\omega_B(0)$=break frequency at delayed critical which can be determined from Equation 1 using spectral density values measured at delayed critical;
$\omega_B(\rho)$=break frequency for subcritical condition;
$\rho$=negative reactivity in $\beta$ units (dollars); and
$\beta_e$=effective delayed neutron fraction.

$N_1$, $N_2$, $N_3$ and $N_4$ are the spectral density values at frequency intervals $\omega_1$, $\omega_2$, $\omega_3$ and $\omega_4$, respectively, and A, B, C, D and E are constants depending upon the frequencies chosen and are calculated as follows:

$$A = \left(\log \frac{\omega_1}{\omega_2}\right)\left(\log \frac{\omega_3}{\omega_4}\right)$$

$$B = \left(\log \frac{\omega_3}{\omega_4}\right) \log \omega_1$$

$$C = -\left(\log \frac{\omega_1}{\omega_2}\right) \log \omega_3$$

$$D = \log \frac{\omega_3}{\omega_4}$$

$$E = -\log \frac{\omega_1}{\omega_2}$$

By the insertion of the information required by the combined Equations 1 and 2 directly into a simple computer, a value for the shutdown margin $\rho$ is obtained.

(2) Two frequency channels $\omega_1$ and $\omega_4$ are selected as wide apart as practical. The spectral density ratio of these two frequencies is computed and the shutdown margin determined as based on the following equation:

$$\frac{N_1}{N_4} = 1 + \frac{\omega_4^2 - \omega_1^2}{(\rho-1)^2}\left(\frac{\Lambda}{\beta_e}\right)^2 - \frac{\omega_1^2 \omega_4^2}{(\rho-1)^4}\left(\frac{\Lambda}{\beta_e}\right)^4 \quad (3)$$

where $\Lambda$ is the neutron generation time.

Since the third term on the right of Equation 3 is small in comparison with the second term for frequency intervals of 30 cycles or larger, a close approximation can be made by neglecting the third term and solving for the shutdown margin $\rho$ as follows:

$$\rho = 1 - \frac{\Lambda}{\beta_e}\left\{\frac{\omega_4^2 - \omega_1^2}{\frac{N_1}{N_2} - 1}\right\}^{1/2} \quad (4)$$

With a properly calibrated meter, the ratio of spectral densities $N_1/N_4$ can be directly converted into a value of $\rho$.

(3) The spectral density at delayed critical is measured at a single frequency channel $\omega_1$. The frequency $\omega_1$ should be below the break frequency. Using the previously measured spectral density $N_{10}$ at delayed critical as a reference, the spectral density at the same frequency $\omega_1$ is measured in a delayed critical condition. The ratio of the subcritical to delayed critical spectral densities are then used to compute the shutdown margin directly as based on the following equation:

$$\rho = \left\{\frac{Q}{R}\left[1 + \frac{\Lambda^2}{\beta_e^2}\omega_1^2\left(1 - \frac{R}{Q}\right)\right]\right\}^{1/2} - 1 \quad (5)$$

where $$R = \frac{\text{subcritical spectral density at } \omega_1}{\text{delayed critical spectral density at } \omega_1} = \frac{N_{10}}{N_1};$$

$Q$=the ratio of the neutron flux measured at $\rho$ negative reactivity to the neutron flux measured at the same reactor power level where the reference value $N_{10}$ of delayed critical spectral density was measured.

FIG. 2 of the attached drawings is an embodiment of a system to determine the shutdown margin of a reactor according to the subject invention. The neutron population fluctuations in a reactor 1 are detected by a neutron sensitive chamber 2 whose output current is transmitted through a cable 3 to a wide band amplifier 4. The voltage output of the amplifier is transmitted to a network of fixed frequency filters 5 which may vary in number from one to four depending on the method of solution. Four fixed frequency filters are required for method one, two for method two and one for method three. The signal is then squared in squaring devices 6 and time averaged in time averaging devices 7. The individual outputs of the time averaging devices are the spectral densities at each fixed frequency channel. The spectral densities are transmitted from the time averaging devices to a computer designed to compute the reactor shutdown margin according to one of the three methods discussed above.

Each of the three methods of determining shutdown margin has certain advantages and disadvantages. For example, No. 1 requires four narrow band pass filter units. The results are probably most direct and accurate, and other parameters can be simultaneously obtained. The amount of computing is relatively large and requires a more complex computer than methods No. 2 or No. 3. The use of two channels, method No. 2, is sufficiently accurate for most purposes and is a simple method of obtaining the shutdown margin. The use of a spectral density ratio automatically eliminates the need for direct current level compensation and also cancels many of the spurious signals that originate from sources other than the neutrons themselves. The third method of determining the shutdown margin requires only one channel; however, more stable instrumentation is required than that conventionally used inasmuch as the instrumentation must have a memory for the reference value of delayed critical spectral density $N_{10}$.

The effects of mechanical noise generated in a reactor system can be avoided by careful selection of channel frequencies. Mechanical noises arise in various ways including control rod or fuel vibrations and fluctuations in the density or flow rate of the reactor coolant. Inasmuch as mechanical noises tend to exist in narrow non-shifting frequency ranges, a careful study of the reactor frequency spectrum permits the selection of frequencies for methods 1, 2 and 3 which are free of mechanical noises.

A primary advantage of the subject development is the speed of determining the reactor shutdown margin because of the simultaneous measurements of a few discrete frequency channels. Thus, even allowing time to obtain good statistical averages of the data, the shutdown margin so obtained is nearly the instantaneous value. In contrast, approximately twenty minutes are required to scan the entire frequency spectrum as taught by the prior art. Under conditions wherein the reactor shutdown margin is changing due to xenon buildup, scanning the entire frequency spectrum will provide amplitudes at the various frequencies which do not represent the same reactivity conditions. The middle frequency portion of curve B in FIG. 1, for example, might be affected in several ways due to transient reactivity conditions and long frequency spectrum scanning times. With the xenon concentration increasing and, therefore, with increasing shutdown margin, if the frequency spectrum is scanned from lower to higher frequency values, curve B would tend to become increasingly curved in its middle frequency range with an increasing slope in the higher middle frequencies. This middle frequency spectral density decrease with increasing frequencies will indicate a break frequency which is higher than the break frequency which represents the actual reactor shutdown margin at any time during the frequency scanning amplitude measurement. A break frequency which is too low would be indicated if the flux scan is made from higher to lower frequencies with increasing shutdown margin. Additional complications arise due to the fact that the shutdown margin may be decreasing due to xenon decay. With a decreasing shutdown margin and scanning from lower to higher frequencies, a break frequency will result which is lower than the break frequency which represents the actual reactor shutdown margin at any time during the frequency scanning amplitude measurements. When scanning from higher to lower frequencies the resulting break frequency would be too low.

EXAMPLE

To establish the feasability of measuring negative reactivity by neutron population fluctuation spectral density analysis, an analyzer was designed and assembled according to the subject invention and negative reactivity measurements made on the Bulk Shielding Reactor located at Oak Ridge National Laboratory.

Six fixed frequency channels were selected from which data could be taken simultaneously. The center frequencies of the channels were at 6, 10, 20, 40, 60 and 100 cycles per second, with fixed bandwidths of 6 cycles per second (full width at half maximum). The filter used for each channel consisted of a conventional operational amplifier with a Twin-T or parallel-bridge network in the feedback circuit. The input to the filters was the output of a wide band (1–600 cycles per second) amplifier whose input was the current from a nitrogen, filled, boron coated ionization chamber. The output of each filter was then individually squared and time averaged. The mean square values or spectral densities were read out on a digital voltmeter.

An electronics Associates transistorized analog computer, TR-10, was used in conjunction with the Twin-T filter networks to perform the squaring and time averaging operations. The neutron detector was a Reuter-Stokes nitrogen filled, boron coated ionization chamber (RSN-76A) and the wide band amplifier was built specifically for noise analysis. The wide band amplifier had a gain of $2.5 \times 10^4$ and the amplifier noise related to the input was 4 microvolts peak to peak.

The means square value or spectral density of each frequency channel was read out individually by switching the digital voltmeter. All spectral density measurements were corrected for neutron detection noise. Values of negative reactivity were then computed using Equation 3 of previously outlined method 2. Method 2 was used exclusively in this investigation because it was the simplest and most convenient method. Reference negative reactivities were evaluated using the well known distributed poison method. A comparison of results obtained according to the subject method using spectral density analysis and the prior art distributed poison method for the same reactor conditions is presented in the following table:

*Table*

| Subcritical condition | A | B | C |
|---|---|---|---|
| Negative reactivity by distributed poison method | 0.28 | 0.66 | 0.99 |
| Negative reactivity by spectral density analysis | 0.27 | 0.66 | 1.1 |

While it is apparent that hand calculations may be used in computing negative reactivities according to Equation 3, a simple electronic automatic computer would be preferable when using the subject method on a routine basis. The automatic computer would perform the required calculations faster than possible by hand, and would provide continuous readings in keeping with the objects of this invention.

Many modifications of and deviations from the embodiments disclosed herein may be made without departing from the spirit and scope of the present invention. For instance, the output signal from a filter network could be rectified instead of squared prior to the time averaging operation. The foregoing illustrative description of the embodiments accordingly should not be interpreted in a limiting sense. The invention should be limited only by the scope of the claims appended hereto.

What is claimed is:
1. A method for measuring the negative reactivity of a neutronic multiplying system by analysis of the signal generated by a neutron detector exposed to neutrons from said system, comprising the steps of:
   (1) amplifying the said signal;
   (2) filtering said amplified signal to isolate signals in at least two different discrete frequency channels;
   (3) measuring the spectral densities of each of said isolated signals; and

(4) computing the negative reactivity of said neutronic multiplying system from said spectral densities.

2. A method for measuring the negative reactivity of a neutronic multiplying system by analysis of the signal generated by a neutron detector exposed to neutrons from said system, comprising the steps of:
(1) amplifying said signal;
(2) filtering said amplified signal to isolate signals in at least two different discrete frequency channels;
(3) squaring the signal amplitude of each of said isolated signals;
(4) averaging said squared signals with respect to time to obtain the mean square amplitude of said signals;
(5) dividing said mean square amplitudes by the bandwidths of the respective frequency channels to obtain the spectral densities at said respective frequency channels; and
(6) computing the negative reactivity of said neutronic multiplying system from said spectral densities.

3. The method of claim 1 wherein four discrete frequency channels $\omega_1$, $\omega_2$, $\omega_3$ and $\omega_4$ are isolated; two of said frequency channels $\omega_1$ and $\omega_2$ being selected below the break frequency and two of said frequency channels $\omega_3$ and $\omega_4$ being selected above the break frequency, the spectral densities $N_1$, $N_2$, $N_3$ and $N_4$ of said isolated frequency channels being used to compute the negative reactivity $\rho$ of said neutronic multiplying system according to the following equation:

$$\rho = \frac{\omega_B(0) - \omega_B(\rho)}{\omega_B(0) - \beta_e \omega_B(\rho)}$$

where:
$\omega_B(0)$ = the break frequency with the reactor critical on delayed neutrons;
$\omega_B(\rho)$ = the break frequency with negative reactivity $\rho$;
$\beta_e$ = the effective delayed neutron fraction $$\omega_B(\rho) = \log^{-1}\left\{\frac{\log\left[\left(\frac{N_3}{N_1}\right)^A \left(\frac{N_1}{N_2}\right)^B \left(\frac{N_2}{N_4}\right)^C\right]}{\log\left[\left(\frac{N_1}{N_2}\right)^D \left(\frac{N_3}{N_4}\right)^E\right]}\right\}$$

$$A = \left(\log \frac{\omega_1}{\omega_2}\right)\left(\log \frac{\omega_3}{\omega_4}\right)$$

$$B = \left(\log \frac{\omega_3}{\omega_2}\right)\left(\log \frac{\omega_3}{\omega_4}\right)$$

$$C = -\left(\log \frac{\omega_3}{\omega_4}\right) \log \omega_1$$

$$D = \log \frac{\omega_3}{\omega_4}$$

and $$E = -\log \frac{\omega_1}{\omega_2}$$

4. The method of claim 1 wherein two discrete frequency channels $\omega_1$ and $\omega_4$ are isolated, the spectral densities $N_1$ and $N_4$ of said isolated discrete frequency channels being used to compute the negative reactivity $\rho$ of said neutronic multiplying system according to the following equation:

$$\frac{N_1}{N_4} = 1 - \frac{\omega_4^2 - \omega_1^2}{(\rho-1)^2}\left(\frac{\Lambda}{\beta_e}\right)^2 - \frac{\omega_1^2 \omega_4^2}{(\rho-1)^4}\left(\frac{\Lambda}{\beta_e}\right)^4$$

where
$\Lambda$ = the neutron generation time; and
$\beta_e$ = the effective delay neutron fraction.

5. The method of claim 1 wherein two discrete frequency channels $\omega_1$ and $\omega_4$ are isolated, said frequency channels $\omega_1$ and $\omega_4$ being at least 30 cycles apart, the spectral densities $N_1$ and $N_4$ of said isolated discrete frequency channels being used to compute the negative reactivity $\rho$ of said neutronic multiplying system according to the following equation:

$$\rho = 1 \frac{\Lambda}{\beta_e}\left\{\frac{\omega_4^2 - \omega_1^2}{\frac{N_1}{N_4} - 1}\right\}^{\frac{1}{2}}$$

where:
$\Lambda$ = the neutron generation time; and
$\beta_e$ = the effective delayed neutron fraction.

References Cited by the Examiner

UNITED STATES PATENTS

| | | | |
|---|---|---|---|
| 2,931,761 | 4/60 | Hurvitz | 250—83.1 |
| 2,982,473 | 5/61 | Goertzel | 176—79 |
| 3,055,588 | 9/62 | Ratz | 235—151 |
| 3,069,545 | 12/62 | Lide | 280—83.1 |

RALPH G. NILSON, *Primary Examiner.*

JAMES W. LAWRENCE, *Examiner.*

UNITED STATES PATENT OFFICE
CERTIFICATE OF CORRECTION

Patent No. 3,188,470                                    June 8, 1965

Charles W. Ricker et al.

It is hereby certified that error appears in the above numbered patent requiring correction and that the said Letters Patent should read as corrected below.

Column 2, line 16, for "multipling" read -- multiplying --; column 4, equation "(4)" should appear as shown below instead of as in the patent:

$$\rho = 1 - \frac{\Lambda}{\beta_e} \left\{ \frac{\omega_4^2 - \omega_1^2}{\frac{N_1}{N_2} - 1} \right\}^{1/2}$$

column 5, line 73, for "feasability" read -- feasibility --; column 6, line 13, after "nitrogen" strike out the comma; line 18, for "electronics" read -- Electronics --; line 27, for "means" read -- mean --; line 60, for "a filter" read -- the filter --; column 8, line 21, for "delay" read -- delayed --; lines 30 to 33, the equation should appear as shown below instead of as in the patent:

$$\rho = 1 - \frac{\Lambda}{\beta_e} \left\{ \frac{\omega_4^2 - \omega_1^2}{\frac{N_1}{N_4} - 1} \right\}^{1/2}$$

Signed and sealed this 22nd day of February 1966.

(SEAL)
Attest:

ERNEST W. SWIDER                               EDWARD J. BRENNER
Attesting Officer                              Commissioner of Patents

UNITED STATES PATENT OFFICE
CERTIFICATE OF CORRECTION

Patent No. 3,188,470                                               June 8, 1965

Charles W. Ricker et al.

It is hereby certified that error appears in the above numbered patent requiring correction and that the said Letters Patent should read as corrected below.

Column 2, line 16, for "multipling" read -- multiplying --; column 4, equation "(4)" should appear as shown below instead of as in the patent:

$$\rho = 1 - \frac{\Lambda}{\beta_e} \left\{ \frac{\omega_4^2 - \omega_1^2}{\frac{N_1}{N_2} - 1} \right\}^{1/2}$$

column 5, line 73, for "feasability" read -- feasibility --; col 6, line 13, after "nitrogen" strike out the comma; line 18, for "electronics" read -- Electronics --; line 27, for "means" read -- mean --; line 60, for "a filter" read -- the filter --; colum 8, line 21, for "delay" read -- delayed --; lines 30 to 33, the equation should appear as shown below instead of as in the paten $$\rho = 1 - \frac{\Lambda}{\beta_e} \left\{ \frac{\omega_4^2 - \omega_1^2}{\frac{N_1}{N_4} - 1} \right\}^{1/2}$$

Signed and sealed this 22nd day of February 1966.

(SEAL)
Attest:

ERNEST W. SWIDER                                      EDWARD J. BRENNER
Attesting Officer                                       Commissioner of Patents